United States Patent [19]
Pielkenrood et al.

[11] 3,721,347
[45] March 20, 1973

[54] PURIFICATION DEVICE FOR REMOVING HEAVY COMPONENTS FROM A SUSPENSION

[75] Inventors: Jacob Pielkenrood; Willem L. B. Ambrosius; Willem Kooistra, all of Krommenie, Netherlands

[73] Assignee: Pielkenrood-Vinitex N.V., Assendelft, Netherlands

[22] Filed: June 26, 1970

[21] Appl. No.: 50,283

[52] U.S. Cl. .................................. 210/519, 210/522
[51] Int. Cl. ........................................... B01d 21/02
[58] Field of Search ....... 210/170, 519, 521, 522, 532

[56] References Cited

UNITED STATES PATENTS

| 3,482,694 | 12/1969 | Rice et al | 210/522 X |
| 2,077,057 | 4/1937 | Poole | 210/521 X |

FOREIGN PATENTS OR APPLICATIONS

| 746,980 | 3/1956 | Great Britain | 210/521 |
| 635,611 | 4/1950 | Great Britain | 210/521 |
| 982,912 | 6/1951 | France | 210/521 |

Primary Examiner—Reuben Friedman
Assistant Examiner—F. F. Calvetti
Attorney—Bayard H. Michael

[57] ABSTRACT

A device for purifying a liquid, comprising a separator with corrugated plates or troughs, the longitudinal axis of which includes, in the operational position, an angle with the horizontal plane, the lower end of which separator is immersed completely but only at a small depth in the liquid in a supply basin, the upper end of the separator being closed in an airtight manner and being connected to a suction means, which may maintain a liquid flow in the separator, the liquid being taken from the surface of the liquid in the basin where the sediment concentration is low, and the sediment precipitated in the separator is turned to the basin separated from the liquid entering this separator.

16 Claims, 6 Drawing Figures

PATENTED MAR 20 1973

INVENTORS
JACOB PIELKENROOD
WILLEM L. B. AMBROSIUS
WILLEM KOOISTRA
BY
ATTORNEY

PURIFICATION DEVICE FOR REMOVING HEAVY COMPONENTS FROM A SUSPENSION

BACKGROUND OF THE INVENTION

For separating the components of a suspension or the like it is known to use a separator comprising sloping corrugated plates or troughs, in which the suspension flow is divided into parallel partial flows with a corresponding shorter precipitations path length. For separating a heavy component, the liquid is introduced in the lower extremity of the sloping separation assembly, the purified liquid being discharged at the higher extremity, and the sediment flowing back in the opposite sense towards the lower end. The liquid flow is maintained by the static pressure at the supply side.

For some purposes such a device is impractical. Waste water is, in general, biologically purified by means of bacteria acting upon the water in the presence of oxygen. This may be done in a so called oxidation ditch, i.e., a rather shallow annular ditch containing sufficient suitable bacteria, the water being slowly circulated in one sense through this ditch. Oxygen may be supplied by using rotating brushes which are partly immersed into the water, which, at the same time, keep the water moving. After a certain residence time the water is purified, and may be removed by means of a weir, Generally an additional sedimentation is necessary for removing the silt carried along, which silt should be returned to the ditch since it contains useful bacteria.

Theoretically the yield of such a device might be improved by separating the silt from the water by means of a plate separator, but this has appeared to be impracticable, since such a separator requires a rather deep basin in which the sloping plate assembly may be submerged, and the silt is to be returned from the lowest point to the ditch. This requires provisions which are, in proportion to the advantages obtained, too expensive.

Comparable circumstances may be found in systems for separating valuable heavy components from a liquid, such as salts of precious metals, in which the carrier liquid is removed in order to obtain a gradual enrichment of the suspension.

SUMMARY OF THE INVENTION

The invention is based on the idea to use a separator of the kind mentioned above for removing the more or less purified liquid from near the free surface of the liquid, so that it is not necessary to place this separator in a deep basin.

The device according to the invention, comprising a supply basin for the liquid to be treated and a separating assembly of corrugated plates or troughs having a longitudinal axis sloping in respect of the horizontal plane, is characterized in that, in the operative position, the lower extremity of its separation assembly is directed substantially horizontally, and in that the upper extremity is closed in an air-tight manner and is connected to a suction means maintaining a liquid flow in the separation assembly. This suction means is, in general, a siphon, the discharge end of which opens into a collecting tank below the lower extremity of the separation assembly, which siphon may be filled by means of a suction pump.

Figure 1:
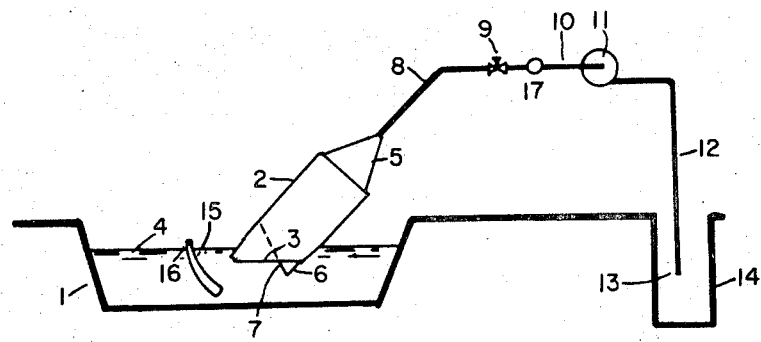
FIG. 1 shows a diagrammatic representation of a purification device according to the invention.

The device of FIG. 1 comprises a supply and sedimentation basin 1, which may be a part of an oxidation ditch, and a separator 2, comprising an assembly of corrugated plates or troughs. The lower border 3 of this separator is immersed at a small depth in the liquid 4 in the basin 1 and is substantially horizontal, the axis of the separator 2 including an angle with the lower border 3. The upper end 5 of this separator is closed in an air-tight manner.

DESCRIPTION OF THE PREFERRED EMBODIMENTS

At the lower extremity of the separator 2 guiding partitions 6 are provided delimiting channels which are alternately directed towards tops and valleys of the separation passages of this assembly, the channels communicating with the valleys being closed by transverse plates 7, so that the sediment flow from the valleys is kept completely separated from the supply flow, as described in copending patent application Ser. No. 47,575, filed June 18, 1970 and assigned to the assignee of the present application. As shown the lower border 3 is a part of an enclosure of the separator proper.

For generating a liquid flow the upper end 5 of the separator is connected with a suction line 8, which communicates via a valve 9 and an extension line 10 with an air pump 11, which is connected with a discharge line 12, the other end 13 of which opening in a collecting tank 14 in a lower point than the lower border 3 of the separator 2. When the pump 11, with the valve 10 opened, generates a sufficient negative pressure, the liquid 4 is sucked into the separator 2, and, as soon as the lines 8, 10 and 12 are completely filled, the liquid flow is maintained by siphon action, after which the pump 11 may be cut out. For still improving the uniformity of the flow, a flow guiding body 15 may be positioned before the separator 2, which body is preferably adjustable around a horizontal axis 16.

A number of such separators 2 may be connected to one single suction line 10 by means of a connecting duct 17. The valves 9 allow to cut out these separators individually without disturbing the siphon action in the other ones.

The sediment in the separator 2 will often gradually cumulate on the plates or troughs, so that the separator is to be cleaned from time to time. This may be done very simply by abruptly interrupting the operation of the siphon, so that the sediment is dragged along with the liquid which suddenly flows backward. The interruption may be caused, for instance, by using a three-way valve 9, the third connection of which opens into the atmosphere, so that air may be introduced into the highest point of the siphon for interrupting its operation.

Figure 2:
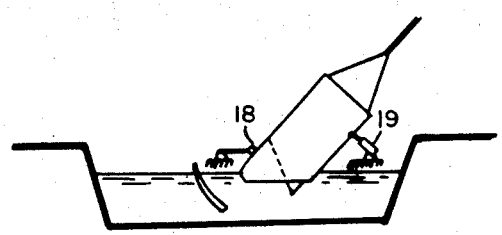
FIGS. 2 and 3 are corresponding partial views of other embodiments of the invention.
Figure 3:
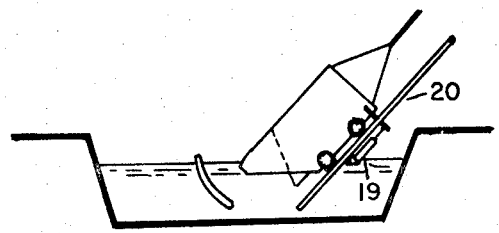

FIG. 2 and 3 show other ways for interrupting this siphon by retracting the separator 2 from the liquid. In FIG. 2 the separator may be tilted around a pivot 18 by means of a drive cylinder 19, and in FIG. 3 the separator 2 is mounted on a slide 20, and may be moved parallel to its axis by a drive cylinder 19. The embodiment of FIG. 2 has the advantage that the inclination of the separator is increased which facilitates the removal of the sediment. It is also possible to introduce air into the lower end of the separator for interrupting the siphon. In the case where a plurality of separators are used, the three-way valves 9 prevent an interaction between the separation during cleaning one of them, and these valves may be coupled with the means for extracting the corresponding separator.

Figure 4:
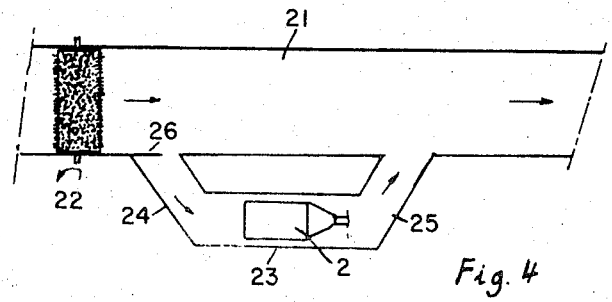
FIG. 4 is a plan view of a part of an oxidation ditch with a device according to the invention.

FIG. 4 shows an oxidation ditch 21, in which the water is kept moving by means of rotating brushes 22 as indicated by arrows, which brushes, at the same time, provide a continuous aeration of the water. The flow rate is rather high, e.g., 0,3 m/s, in order to counteract the precipitation of silt.

If the separator 2 would be positioned in the oxidation ditch 21, this high velocity would cause turbulences at the entry of the separator disturbing the uniform supply of the liquid, and causing remixing of the sediment with the liquid. Moreover this velocity is much higher than is desired for a good separation effect in the separator, and the thrust pressure caused thereby, which is not uniformly distributed over the entry of the separator, may cause a non-uniform flow distribution in the various passages of the separator impairing the yield of the separator. Moreover the relatively large width of the separator may cause a serious disturbance of the flow in the ditch 21.

In order to improve the operation, the separator 2 may be mounted in a shunt 23 of the ditch 21 having entry and exit ends 24 and 25 respectively. At the entry an adjustable partition 26 or like is provided for reducing the velocity of the flow in the shunt 23 so that a better approximation of the desired flow rate in the separator passages (about 5 mm/s) is obtained. In this manner turbulences at the entry of the separator 2 may be reduced, as well as the thrust pressure, so that the liquid flow in the separator is mainly determined by the suction in the suction line 8.

However the reduction of the velocity in the shunt 23 may cause precipitation of sediment in the entry 24 as well as in the exit 25, so that the shunt 23 will silt up rather quickly.

Figure 5:
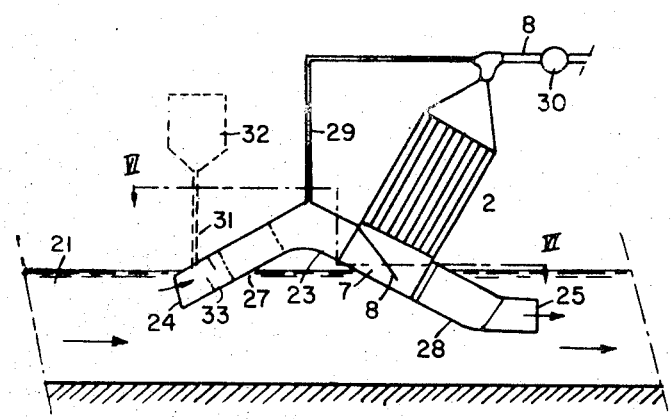
FIGS. 5 and 6 are diagrammatical cross-sections of an improved embodiment of the invention.
Figure 6:
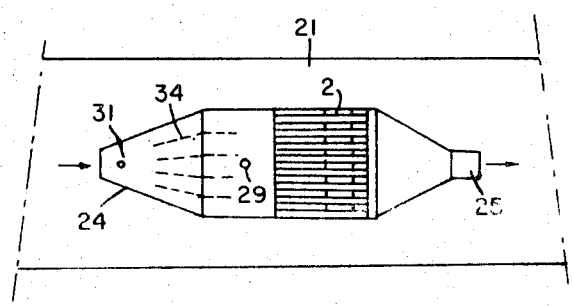

FIGS. 5 and 6 show an embodiment in which this draw-back is avoided, in which the shunt 23 has the shape of a flat box which is bent in such a manner that, in the flow sense, an upward branch 27 and a downward branch 28 are provided. In order to obtain the desired velocity reduction, the upward branch 27 has a diverging cross-section as appears from FIG. 6.

The separator 2 is mounted on the downward branch which has the same width as the separator, but beyond the separator the width is gradually decreasing. The slope of the downward branch is such that the longitudinal axis of the separator 2 is substantially perpendicular to the axis of this branch.

From FIG. 5 it appears that the guiding partitions 7 extend up to the bottom of the branch 28. The transverse plates 8 prevent the entry of liquid into the valleys of the passages of the separator 2, and, thus, remixing of the sediment with the liquid. These plates 8 do not extend up to this opposing wall of the branch 28 in order to prevent accumulation of sediment against these plates.

The extended partitions 7 maintain the flow as laminar as possible. Since the separator is substantially perpendicular to the flow direction the influence of the thrust pressure of the flow is nearly completely suppressed, so that the flow entering the separator is made very uniform. More specifically, the velocity in the downward branch 28 near the entry of the separator is made of the same order of magnitude as the velocity in the separator itself. In this manner an optimal separation may be obtained.

It is possible that at the upper side of the bend of the shunt 23 air cushions or floating constituents will be accumulated, which may hinder the liquid flow. Therefore a suction line 29 is provided connecting the highest point of the bend with the suction line 8. The cross-section of line 29 is small in comparison with the total cross-section of the separator 2, so that the amount of liquid removed to this line 29 is very small. It is possible to arrange the separator 2 in the highest point of the shunt 23, but this has the inconvenient that floating light objects may obstruct the separator. On the other hand, means may be provided at the suction line 29 for removing such objects.

Sediment precipitated in the upward branch 27 will slide downward and is returned to the ditch 21, as is also the case with the sediment from the separator 2, which cannot be accumulated in the downward branch 28 either, which is sufficiently sloping.

As the liquid downstream of the separator has a greater density than upstream, the shunt 23 will act as a siphon enhancing the flow. Moreover the exit end 25 is, in the present case, lower than the entry 24, which still improves the siphon action, and has, moreover, the advantage of discharging the sediment nearer to the bottom of the ditch.

It may be advantageous to choose the cross-section of the exit end 25 such that the outflow velocity is smaller than the velocity of the water flowing in the ditch 21, leading to an ejector pump action enhancing the flow in the shunt 23. If necessary flow control means may be provided in the end parts 24 and/or 25. Obviously the cross-section of the exit end should be smaller than that of the entry, since a part of the supplied liquid is discharged through the suction line 8. In this suction Line a control valve 30 may be provided for maintaining the discharge flow at a constant value or varying the flow in function of the liquid level in the ditch 21.

As appears from FIGS. 5 and 6, the entry side immersed in the water is rather small, so that the flow in the ditch is not much disturbed thereby.

In many cases it may be favorable to connect a duct 31 for supplying a flocculation or sedimentation agent from a container 32 to the entry part 24. In the upward branch 27 small partitions 33 may be arranged causing turbulences promoting the mixing of said agent with the liquid. In order to suppress these turbulences again, guiding partitions 34 may be provided as indicated in FIG. 6.

The separator may be constructed in any suitable manner, and more specifically as described in the above-identified copending patent application Ser. No. 47,575 in which, for instance, the sediment flow may be kept completely separated from the liquid flow.

We claim:

1. An apparatus for separating heavier components from a mixture having at least one substance suspended in a liquid comprising a supply basin through which the mixture to be treated is circulated;

a separator assembly having a plurality of parallel, elongated flow passages through which at least a portion of said mixture is flowed to separate heavier components therefrom;

means for positioning said separator assembly in the supply basin so that the longitudinal axis of said flow passages is inclined with respect to a horizontal plane and only the lower portion of said separator assembly corresponding to the inlet of said flow passages is below the surface of said mixture in the supply basin with the upper end of said separator assembly corresponding to the outlet of said flow passages being above the inlet end;

closure means for closing the outlet end of said separator assembly in a substantially air-tight manner;

suction means in communication with the closure means for establishing and maintaining flow of said mixture upwardly through said flow passages, the heavier components separating from said mixture in the flow passages and gravitating towards said basin through the inlet end of said separator assembly and the separated liquid flowing out of said outlet end; and means for rapidly increasing the pressure in the outlet end of said separator assembly so that the upward flow of said mixture through said flow passages is interrupted and is reversed to flow back into said basin.

2. The apparatus according to claim 1 including collecting means positioned below the elevation of the inlet end of said separator assembly for collecting the separated liquid;

first conduit means in communication with said closure means and said collection means, said first conduit means being arranged to provide a siphoning action on the mixture entering the inlet end of said separator assembly; and wherein said suction means comprises suction pump means in communication with said outlet end for reducing the pressure in said first conduit to initiate the siphoning action.

3. The apparatus according to claim 2 including flow guiding means positioned in said supply basin upstream and adjacent to the inlet of said separator assembly, said guiding means extending substantially vertical to the longitudinal axis of said flow passages.

4. The apparatus according to claim 2 wherein said pressure increasing means comprises means for introducing atmospheric air into said closure means.

5. The apparatus according to claim 2 wherein said positioning means includes means cooperatively connected to said separator assembly for withdrawing the inlet end of said separator assembly from the mixture in the supply basin.

6. The apparatus according to claim 5 wherein said withdrawing means includes means providing a fixed pivotable axis, the inlet end of said separator assembly being carried on said axis; and means operatively connected to said separator assembly for pivoting said separator assembly about said axis to withdraw said inlet end from the mixture in the supply basin.

7. The apparatus according to claim 5 wherein said withdrawing means includes platform means positioned adjacent said separator assembly and arranged at an incline corresponding to that of said separator assembly, said separator assembly being slidably mounted to said platform means; and means operatively connected to said separator assembly for moving said separator assembly up said inclined platform to remove said inlet end from the mixture in the supply basin.

8. The apparatus according to claim 2 including a plurality of said separator assemblies;

second conduit means connecting the closure means of all of said separator assemblies to said first conduit means; and valve means located in each of said second conduit means and interposed each of the respective separator assemblies and said first conduit means, said valve means being operated independently to admit atmospheric pressure into the respective separator assembly and arranged to be closed automatically before the interrupting means associated with the corresponding separator assembly is operated.

9. The apparatus according to claim 1 wherein said supply basin includes a by-pass duct having an inlet and outlet positioned below the surface of said mixture through which a portion of the mixture in the supply basin flows;

said separation assembly being located in said by-pass duct; and said by-pass duct being arranged so that the flow rate of said mixture in the portion of the duct adjacent to the inlet of said separator assembly is less than that of the flow of the mixture in the supply basin and the direction of flow of said mixture through the duct is substantially perpendicular to the longitudinal axis of the flow passages of said separator assembly.

10. The apparatus according to claim 9 wherein said by-pass duct is a pipe having adjoining first and second portions inclining upwardly and downwardly with respect to the flow direction of the mixture in the supply basin, respectively, with the mixture entering the outer end of said first portion and exiting said pipe through the outer end of said second portion, said separator assembly being mounted in said second portion with the longitudinal axis of said second portion being substantially perpendicular to the longitudinal axis of the separator assembly flow passages.

11. The apparatus according to claim 10 including a third conduit means communicating between the highest point in said pipe between said first and second portions and said closure means through which a bleed flow of said mixture passes.

12. The apparatus according to claim 10 wherein the elevation of the outlet of said pipe is below that of the inlet of said pipe.

13. The apparatus according to claim 10 wherein the cross sectional area of said first and second portions diverge and converge in the direction of the flow of said mixture through said pipe, respectively.

14. The apparatus according to claim 13 wherein the cross section of said first and second portions are arranged so that the flow rate of said mixture exiting said second portion is not in excess of the flow rate of the mixture flowing through the supply basin.

15. The apparatus according to claim 10 wherein said separator assembly comprises superposed corrugated means defining said flow passages and further includes vertical guiding partitions at the inlet of the separator assembly extending to a lower wall of said pipe opposite to said inlet, said partitions defining ducts alternately communicating with the tops and valleys respectively of the flow passages of the separator assembly with the ducts communicating with the valleys being provided with transverse plates extending at an angle from the upper portion of the inlet of the separator assembly and closing the greater part of said ducts.

16. The apparatus according to claim 15 including substantially vertical extending guide partition means positioned upstream of said separator assembly in said first portion of the pipe.

* * * * *